(No Model.)

J. E. ATKINS.
SEED PLANTER.

No. 412,907. Patented Oct. 15, 1889.

Witnesses.
A. Ruppert
H. A. Daniels

Inventor:
James E. Atkins
Per
Thomas P. Simpson
Atty

UNITED STATES PATENT OFFICE.

JAMES E. ATKINS, OF MAYESVILLE, SOUTH CAROLINA.

SEED-PLANTER.

SPECIFICATION forming part of Letters Patent No. 412,907, dated October 15, 1889.

Application filed June 14, 1889. Serial No. 314,271. (No model.)

*To all whom it may concern:*

Be it known that I, JAMES E. ATKINS, a citizen of the United States, residing at Mayesville, in the county of Sumter and State of South Carolina, have invented certain new and useful Improvements in Seed-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to drop cotton-seed, peas, rice, or other seed, or any kind of fertilizer that will pass a drill, in two rows at a time and at any preferred distance apart.

Figure 1:
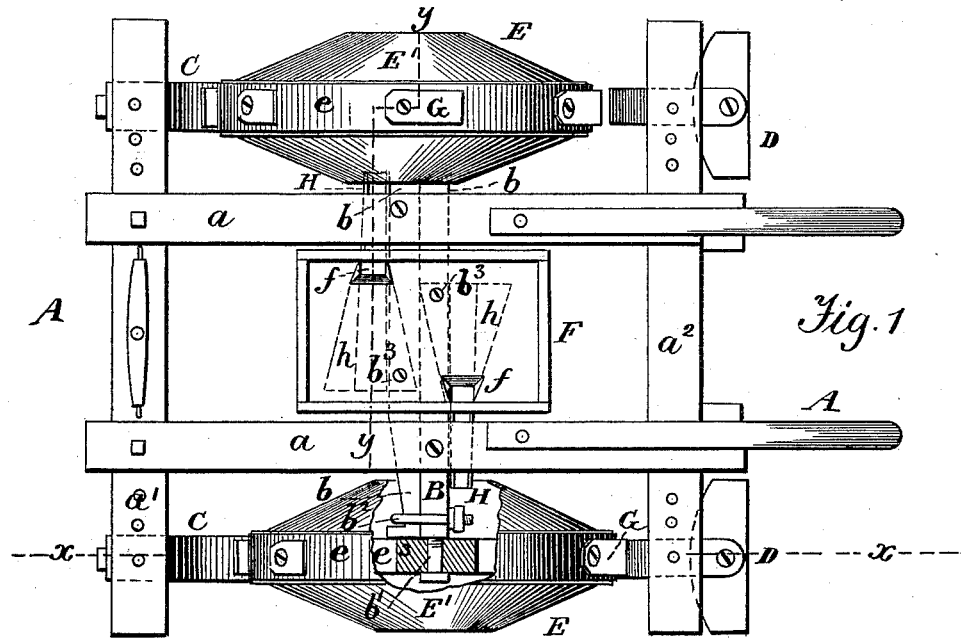
Figure 2:
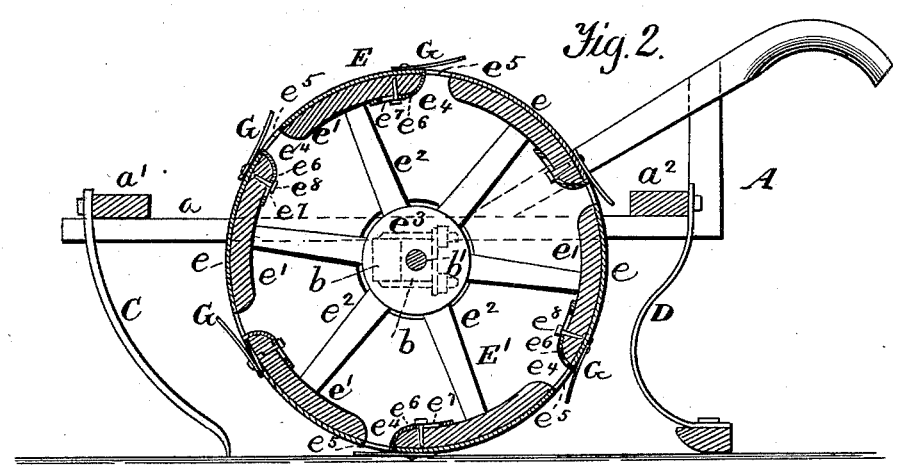
Figure 3:
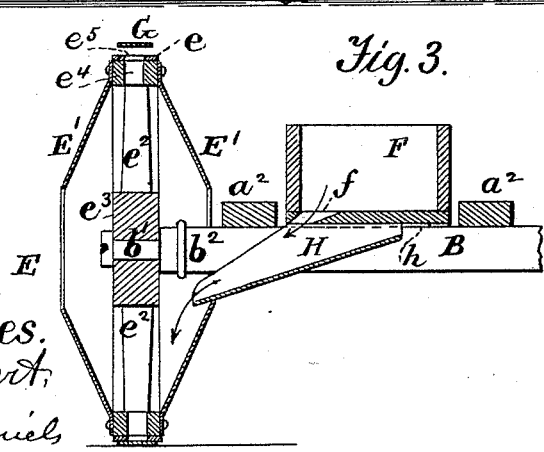

Figure 1 of the drawings is a top plan view; Fig. 2, a vertical longitudinal section on dotted line $x\ x$ of Fig. 1, and Fig. 3 a vertical cross-section on dotted line $y\ y$ of Fig. 1.

In the drawings, A A represent a handled frame, consisting of two flat parallel longitudinal bars $a\ a$, secured about the middle to an axle B, and two similar parallel bars $a'\ a^2$, fastened across the ends of the bars $a\ a$, the front bar $a'$ carrying the furrow-openers C C, and the rear bar $a^2$ provided with the coverers D D. Between the openers and coverers C D are arranged the ground-wheels E E, with outwardly-convexed casing E' to contain seed. These wheels revolve on the fixed axle B, while between the bars $a\ a$ and on the axle B is fastened the hopper F, having holes $f\ f$, through which seed or fertilizer may pass to the subjacent spouts H, and thence into the hollow casing E'. The wheels roll in the furrows made by the openers, and drop the seed through holes in the tire $e$, the latter being supported by the fellies $e'$, spokes $e^2$, and hub $e^3$. The fellies $e'$ are cut out at their ends to form seed-cups $e^4$ over the tire-holes $e^5$, and these cups may be adjusted in size, so as to sow a greater or less quantity of seed or fertilizer, by means of the angle-plates $e^6$, which are slotted at $e^7$ and held adjustably by a set-screw $e^8$. Over each hole $e^5$ is placed, on the outside of the tire, a plate-spring G, which closes said hole when on the ground, and then opens for the discharge of a cup of seed or fertilizer as it rises on the rear side of the wheel. With this construction the horse and the driver walk in the space between the furrows, while two rows of seed are planted simultaneously.

The axle B is made in two parts $b\ b$, each carrying one screw-journal $b'$, which is easily removed to take off the wheel. The sections $b\ b$ are thus made extensible to suit any desired width of row, and are fastened together by the screw-clips $b^2$. The hopper, as well as the subjacent spouts H H, is clamped to the axle by the same screws $b^3$ which pass through a spout-flange $h$. This makes the spouts adjustable correspondingly to the axle to provide for a difference in the width of rows.

What I claim as new, and desire to protect by Letters Patent, is—

1. The distributing-wheel E, formed of the tire $e$, fellies $e'$, spokes $e^2$, and hub $e^3$, the fellies being cut out to form cups $e^4$, the tires being provided with a hole $e^5$ under each cup, and an angle-plate $e^6$ being arranged over each tire-hole, substantially as shown and described.

2. The dropping-wheel of a planter, provided with a hole $e^5$ in the tire, a seed-cup $e^4$ in the fellies, and an adjustable angle-plate $e^6$, all constructed and arranged substantially as shown and described.

In testimony whereof I affix my signature in presence of two witnesses.

JAMES E. ATKINS.

Witnesses:
F. J. MAYES,
A. A. STRAUSS.